(12) United States Patent
Conger et al.

(10) Patent No.: US 8,114,335 B2
(45) Date of Patent: Feb. 14, 2012

(54) PARTIAL DEPTH-WISE CURE OF A TIRE INNER LINER

(75) Inventors: Kenneth Dean Conger, Stow, OH (US); William Murray Huth, Tallmadge, OH (US); William Allen Rex, Doylestown, OH (US); Frederick Forbes Vannan, Jr., Clinton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 891 days.

(21) Appl. No.: 10/331,948

(22) Filed: Dec. 30, 2002

(65) Prior Publication Data

US 2004/0123936 A1 Jul. 1, 2004

(51) Int. Cl.
*B29D 30/00* (2006.01)
(52) U.S. Cl. ..... 264/501; 264/327; 156/123; 156/130.5; 156/129; 152/510
(58) Field of Classification Search .............. 264/327, 264/501, 362; 156/123, 130.5, 129; 152/510
See application file for complete search history.

(56) References Cited

U.S. PATENT DOCUMENTS

| | | | | |
|---|---|---|---|---|
| 1,387,381 | A | * | 8/1921 | Gammeter ..................... 264/347 |
| 2,066,265 | A | * | 12/1936 | Freeman ....................... 264/501 |
| 3,372,078 | A | | 3/1968 | Fausti et al. |
| 3,933,553 | A | | 1/1976 | Seiberling |
| 4,139,405 | A | * | 2/1979 | Seiberling .................. 156/130.5 |
| 4,176,702 | A | | 12/1979 | Seiberling |
| 4,233,013 | A | * | 11/1980 | Bohm et al. ................ 425/174.4 |
| 4,269,644 | A | * | 5/1981 | Goldstein ........................ 156/96 |
| 4,274,897 | A | * | 6/1981 | Barefoot .......................... 156/96 |
| 5,179,156 | A | * | 1/1993 | Takao et al. .................... 524/518 |
| 5,201,975 | A | | 4/1993 | Holroyd et al. |
| 5,228,965 | A | * | 7/1993 | Ameen et al. ................. 204/206 |
| 5,527,414 | A | | 6/1996 | Dublinski et al. |
| 6,110,319 | A | | 8/2000 | Bohm et al. |
| 6,401,524 | B1 | | 6/2002 | Incavo et al. |
| 6,406,575 | B1 | | 6/2002 | Baumgarten et al. |
| 6,409,959 | B1 | | 6/2002 | Caretta et al. |
| 6,482,282 | B1 | | 11/2002 | Yovichin et al. |

FOREIGN PATENT DOCUMENTS

| | | | |
|---|---|---|---|
| DE | 3832487 | | 3/1990 |
| WO | 98/42499 | | 10/1998 |
| WO | WO 00/30839 | * | 6/2000 |

\* cited by examiner

*Primary Examiner* — Matthew Daniels
*Assistant Examiner* — Lisa Herring
(74) *Attorney, Agent, or Firm* — Thompson Hine LLP

(57) ABSTRACT

A method and apparatus for partial depth-wise cure of a tire inner liner are disclosed. The method comprising forming a layer of uncured rubber, that layer having a first surface and an opposite surface, applying pressure to the layer of rubber, heating the layer of rubber from the first surface to more fully cure the layer on that surface than on the opposite surface, cooling the layer of rubber and releasing the pressure applied to the layer of rubber after the layer has cooled. The apparatus comprising a drum, a heat exchange chamber on the inner surface of the drum, a housing that surrounds the drum, a space between the outer surface of the drum and the housing, an inflatable seal at each end of the housing inside the housing such that by inflating the seal, the seal expands and encloses the space between the drum and the housing, a gas inlet for feeding a gas to the space and pressurizing the space, a heat source in communication with the heat exchange chamber for heating the drum and a coolant source in communication with the heat exchange chamber for cooling the drum.

8 Claims, 7 Drawing Sheets

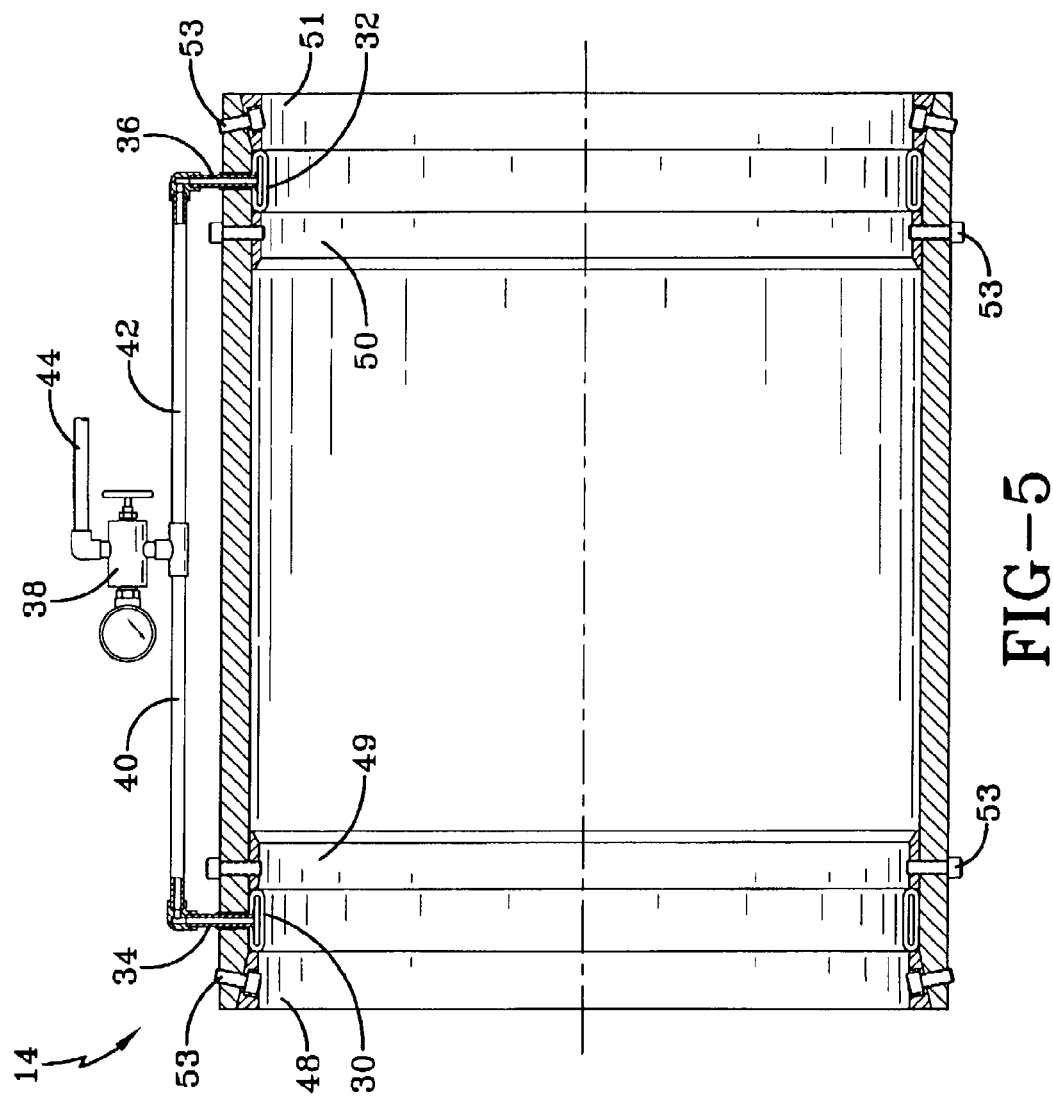

PARTIAL DEPTH-WISE CURE OF A TIRE INNER LINER

BACKGROUND

The present invention relates to a method for partially depth-wise curing the inner liner of a tire. Additionally, the present invention relates to an improved apparatus for curing the inner liner of a tire.

One common method of manufacturing tires uses a vulcanization bladder. This bladder is inflated with steam or a heated fluid like hot water to press the green tire against the walls of the tire mold. There are several problems associated with the use of bladders in the tire vulcanization process. In particular, the bladder can distort the tire during shaping and affect its position in the mold. This can result in serious quality problems. Another problem with the use of bladders is that they are subject to wear. This results in added costs for replacement of bladders along with the labor and time associated with this replacement. Furthermore, there may be defects in the bladder, such as pinhole leaks. A pinhole leak will allow high temperature steam to escape and contact the inner liner of the tire. This can cause steam penetration through the inner liner into layers between other rubber/reinforced components causing defects. Lubrication materials associated with curing bladder use can also contaminate the tire.

Other disadvantages of using a bladder include a lower heat transfer rate (from the curing medium to the tire) because the wall thickness of the bladder reduces the heat flux resulting in longer cure times, thereby adding to the extra costs of time and energy. The problems and disadvantages of using vulcanization bladders increase when manufacturing larger tires such as tractor tires.

Bladderless molding processes have been used in order to reduce the operating costs associated with a vulcanization bladder and to manufacture larger tires. Bladderless molding methods are disclosed in U.S. Pat. Nos. 4,400,342, 5,127,811 and 5,597,429. While the use of bladderless molding has advantages, there are problems that may arise in this method. Direct contact between the green tire and a fluid under pressure may cause problems due to permeation of the fluid into the unvulcanized tire. The fluid permeation may cause separations between the adjacent layers, or adversely interfere in the adhesion processes between the elastomer material and the reinforcing structures.

A method of curing tires which addresses the problem of fluid permeation is disclosed in U.S. Pat. No. 6,409,959 which discloses a process for curing a tire by providing a primer on the inner surface of the tire and applying heat to the tire to vulcanize the first layer of elastomer and form a layer that prevents permeation of the fluid under pressure into the inside of the tire. Once this impermeable layer is formed, the fluid under pressure is admitted to complete the cure of the green tire.

Another approach to bladderless molding is to create a tire inner liner that is impermeable to these curing fluids. A method of preparing a partially cured layer of rubber in the manufacture of tires is disclosed in U.S. Pat. No. 4,139,405 which teaches the use of radiation to effect a cure or partial cure to the layer of rubber. The cured layer may be an inner liner or the tread layer. The amount or depth of cure is controlled by the intensity of radiation employed. The inner liner may be cured after the green tire is formed with the liner or be cured separately and then used as the inner layer in building up a green tire. Radiation may be used to treat the inner liner of the green tire. By shielding portions of the tire, the areas to be irradiated are controlled. Irradiation however, has no beneficial effect on butyl rubber and certain other rubbers including butyl derivatives.

Another method of preparing a partially cured rubber strip is disclosed in U.S. Pat. No. 4,233,013 which teaches an apparatus for the continuous production of cured rubber strips having a surface design such as for tire treads. The apparatus comprises a means for extruding rubber into a soft, viscous continuous rubber strip, a means for forcing the rubber into molding surfaces under pressure and a means for directing radiation or heat into the viscous rubber while maintaining it under pressure. Essentially, after the rubber is extruded into a continuous strip onto a belt, molding means are applied with pressure onto the rubber and the rubber is exposed to radiation or heat to partially cure the rubber sheet.

Yet another method of partial curing is disclosed in U.S. Pat. No. 5,201,975 which teaches a method of manufacturing a tire with use of a heated pattern ring to mold and partially cure a tread package. The uncured tread package is assembled into a pattern ring to impart a pattern to the tread rubber, the tread rubber is then heated to become partially cured and the tire is further assembled by positioning an uncured carcass within the pattern ring so that the carcass contacts the uncured portion of the tread package.

SUMMARY

This invention is directed to a method and apparatus for manufacturing a partially cured inner liner that is useful in a bladderless tire molding process. A partial depth-wise cure of a layer of rubber is obtained through the combined application of pressure and heat, for a predetermined period of time, to one face of the inner liner. More specifically, in accordance with the invention, heat and pressure are applied to the tire to control the curing process such that the depth of the cure or the cure depth profile can be controlled. An inner liner that is more fully cured on one side serves the purpose of a traditional curing bladder by rendering the liner impermeable to curing fluids; meanwhile, the other side of the inner liner is less cured or uncured. In this way, other components of the green tire such the tread layer, the carcass plies, and the beads can be adhered to the tacky uncured surface of the inner liner during the tire building process. Once the green tire is built upon the partially cured inner liner, the tire can be vulcanized in a tire molding cavity without the use of a curing bladder.

One manifestation of the invention is a method for preparing an inner liner for a tire comprising the steps of forming a layer of uncured rubber having a first surface and an opposite surface, applying pressure to the layer of rubber, heating the layer of rubber from the first surface to more fully cure the layer on that surface than on the opposite surface, cooling the layer of rubber, and releasing the pressure applied to the layer of rubber after the layer has cooled to a temperature at which curing does not occur significantly.

In a more particular embodiment of the invention, a layer of rubber is provided on a support and enclosed in a vulcanization chamber that is pressurized. The pressure is selected to prevent the byproducts of vulcanization from foaming the rubber layer during the vulcanization process. After the chamber is pressurized, the layer is heated from one side to the desired cure temperature and held for a time at the desired temperature in order to achieve the desired cure profile in which the heated side is more fully cured and the opposing side is less fully cured or uncured. The layer of rubber is heated to a temperature suitable for providing the desired cure profile within the manufacturing time desired. This temperature may be about 250 to 450° F. Typically, the support is a drum. Once the desired cure profile is achieved, the layer is then cooled to a temperature at which the layer no longer cures. Typically, this temperature is less than about 100° F. Finally, the chamber is depressurized. By maintaining pressure on the layer until it cools to a temperature at which it no longer cures, the vulcanization byproducts do not foam the layer when the pressure is released.

Another manifestation of the invention is an apparatus for curing the inner liner of a tire that comprises a curing drum having an inner surface and outer surface, a heat exchange chamber on the inner surface of the drum, a housing that surrounds the drum, a space between the outer surface of the drum and the housing, an inflatable seal at each end of the housing inside the housing such that by inflating the seal, the seal expands and encloses the space between the drum and the housing, a gas inlet for feeding a gas to the space and pressurizing the space, a heat source for heating the heat exchange chamber in the drum, and a coolant for cooling the heat exchange chamber in the drum.

A further embodiment of the invention is a method comprising:

providing an apparatus for curing the inner liner of a tire comprising a drum, the drum having an inner surface and outer surface, a heat exchange chamber on the inner surface of the drum, a housing that surrounds the drum, a space between the outer surface of the drum and the housing, an inflatable seal at each end of the housing inside the housing such that by inflating the seal, the seal expands and encloses the space between the drum and the housing, a gas inlet for feeding a gas to the space and pressurizing the space, a heat source for heating the heat exchange chamber for heating the drum, and a coolant source for cooling the heat exchange chamber for cooling the drum;

providing a layer of uncured rubber having one surface adjacent the outer surface of the drum;

inflating the seal to enclose the space between the housing and the drum;

pressurizing the space between the housing and the drum;

heating the drum to thereby heat the layer of rubber to more fully cure the layer adjacent the outer surface of the drum than the opposite surface, cooling the drum thereby cooling the layer; and releasing the pressure in the space after the layer has cooled.

In a more particular embodiment of the invention, the apparatus comprises a drum wherein the layer of rubber is applied onto the outer surface of the drum. The inner surface of the drum contains the heat exchange chamber which could be divided into zones or subchambers to control the location of the cured area. The housing is mounted on a track by feet that extend from the housing and is movable relative to the drum such that the housing can be located in a first position in which the rubber layer can be applied to the drum and in a second position in which the housing surrounds the drum creating a space between the housing and the drum. The space is sealed by inflating the seals that are at each end of the housing. Once the space is sealed, a gas is fed into the space to pressurize the space, in turn pressurizing the rubber layer. After pressurizing the layer of rubber, the rubber can then be cured by heating. In one embodiment of the invention, the heat exchange chamber in the drum contains channels which receive either a heated fluid or a coolant, whereby the drum is capable of being heated and cooled respectively. The side of the rubber adjacent to the drum is heated to cure the rubber to a desired depth and cooled in conjunction with the drum once the desired depth of cure to the rubber is achieved. Once this is achieved, the pressure on the rubber can be released.

BRIEF DESCRIPTION OF THE DRAWINGS

The invention is illustrated in more detail by reference to the following drawings wherein:

FIG. 5 is a cross-sectional view of the housing.

DETAILED DESCRIPTION

Figure 3:
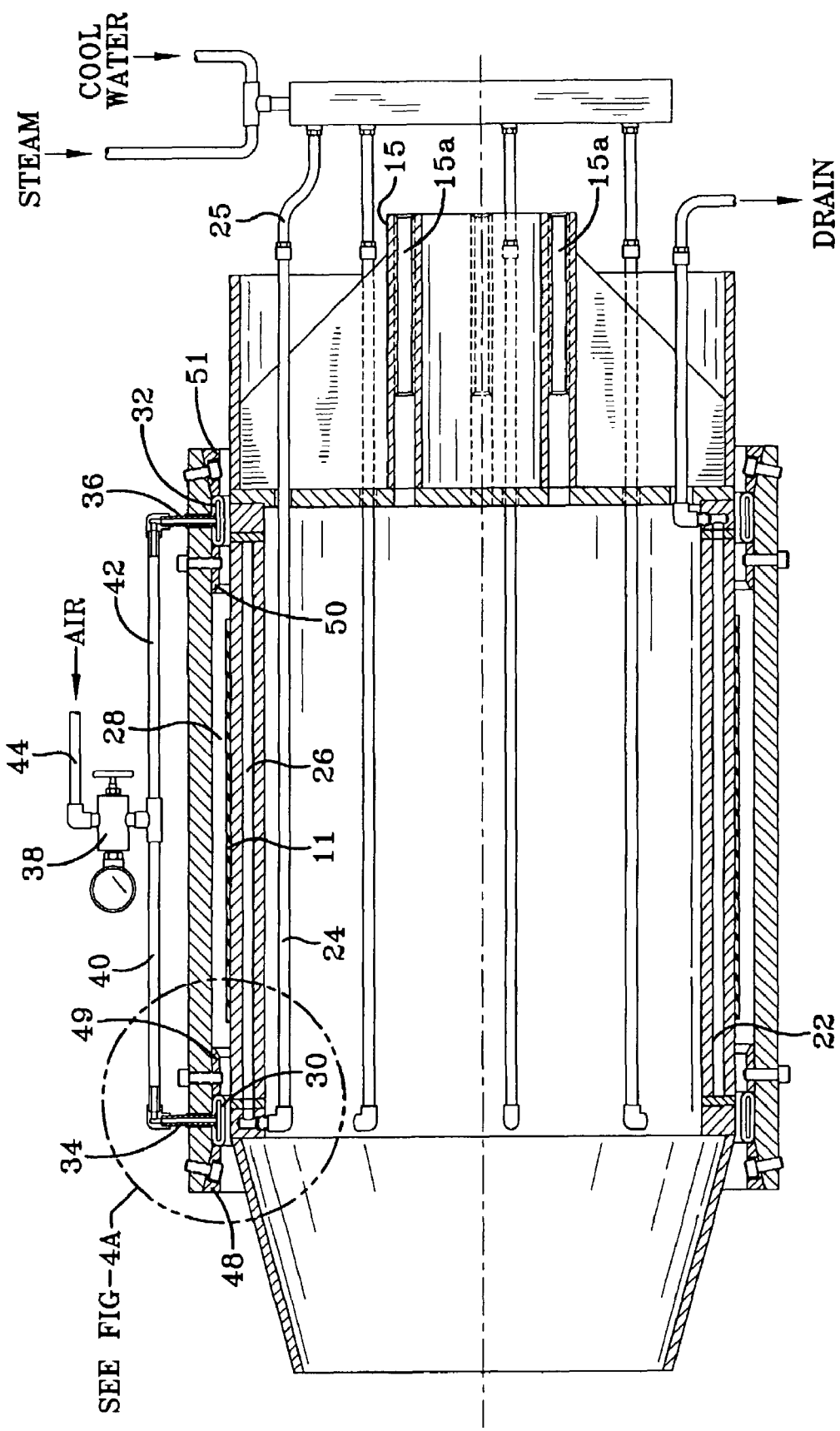
FIG. 3 is a cross-sectional view of an apparatus in accordance with one embodiment of the invention.

In one embodiment of the invention, the apparatus 10 comprises a curing drum 12 and a housing 14 mounted on a track or slide 16. The housing 14 includes a pair of feet 18 that support the housing 14 for movement along the rod 17. The drum 12 is mounted on a vertical frame 13 by means of a hub 15 (FIG. 3) that is secured to the frame 13 by bolts that are received in bores 15a. In the embodiment illustrated, the drum 12 is stationary, but the drum 12 can be mounted for movement relative to the housing 14 and the housing 14 can be stationary, or both the drum 12 and the housing 14 can be mounted for movement with respect to each other.

The drum 12 has an outer surface 20 and an inner surface 22. The outer surface 20 may be textured or smooth and vented to create the desired molded appearance on the inside of the tire. A plurality of fluid supply tubes 24 feed heat exchange media such as steam or hot water to an enclosed heat exchange chamber 26 on the inner surface 22 of the drum 12. The fluid supply tubes are connected by hoses 25 to a tank or manifold 27 which is supplied with the heat exchange medium. While heated fluids are a convenient means to heat the drum, other heat sources such as an electric heating coil or electric induction can also be used.

Figure 1:
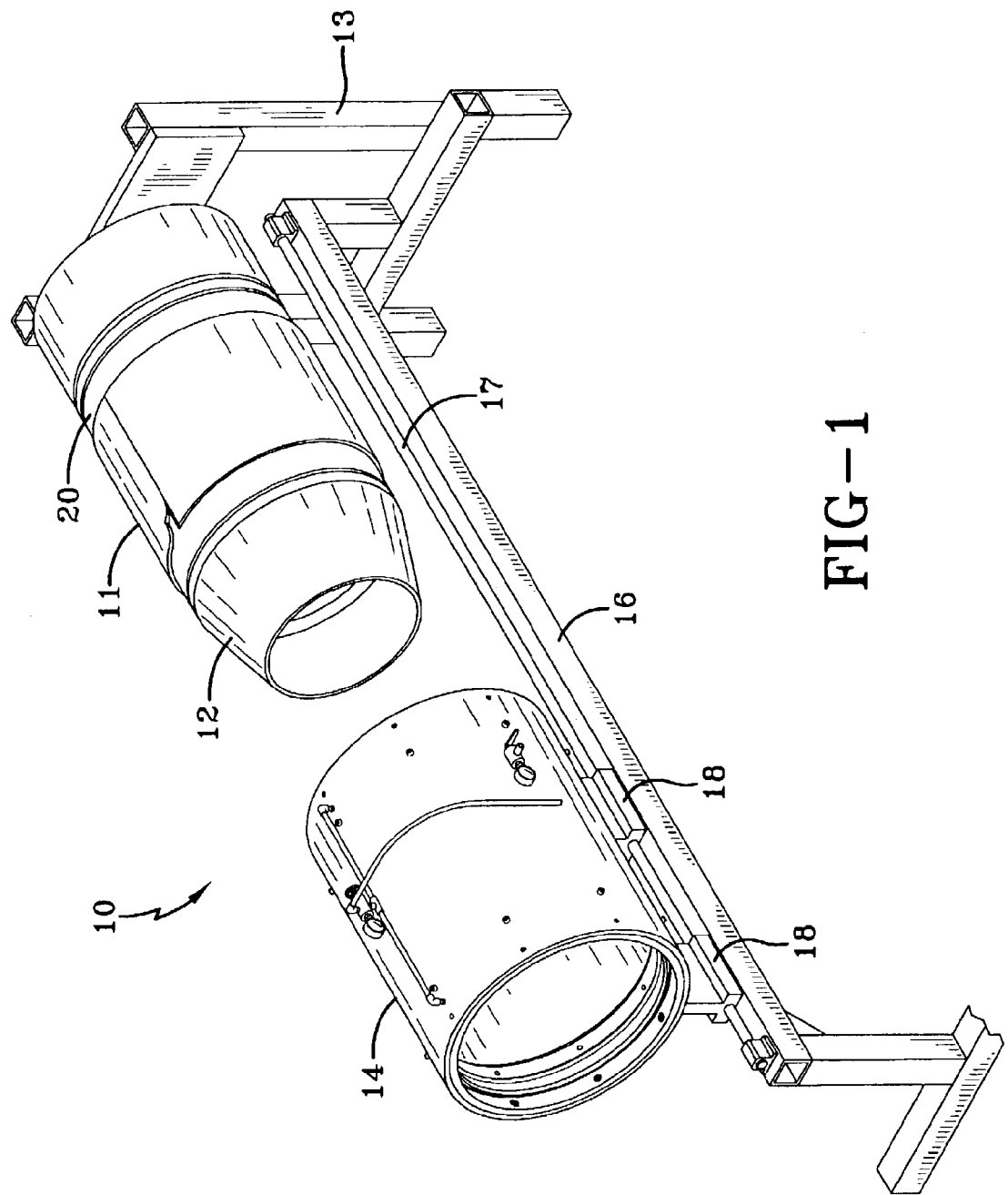
FIG. 1 is a perspective view from the side of a curing apparatus in accordance with one embodiment of the invention.
Figure 2:
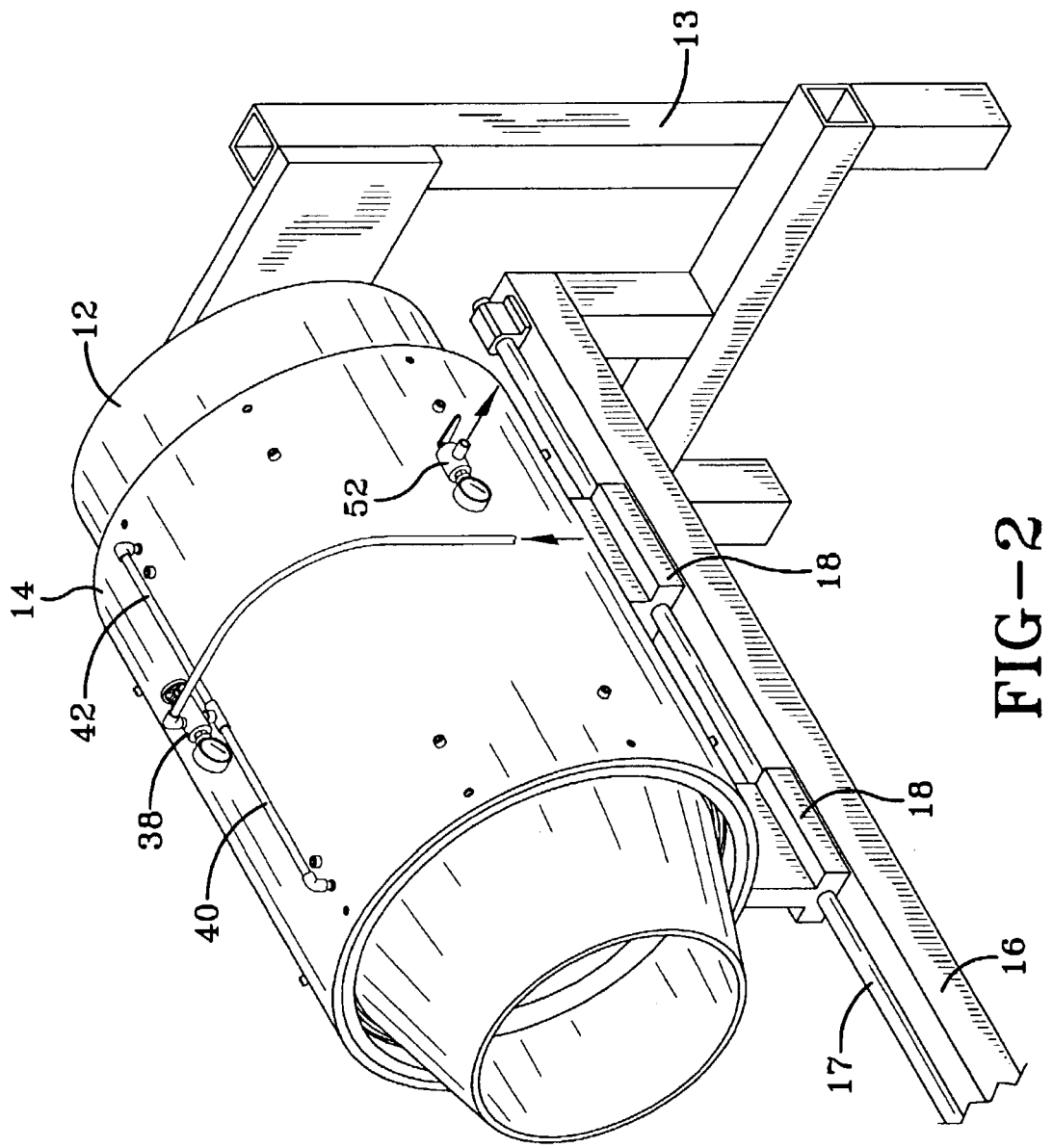
FIG. 2 is a perspective view of the apparatus shown in FIG. 1 in which the housing is positioned around the drum.

The housing 14 is moved into position around the drum 12 as shown in FIG. 2 such that the housing 14 surrounds the drum 12 and a space 28 is provided between the outer surface of the drum 12 and the housing 14. The space 28 can vary in size but it must be slightly wider than necessary to accommodate the inner liner thickness that will be installed on the drum 12. For example, the space 28 may be about 0.25 to 1.0 inch wide.

At the ends of the housing 14 are a first annular inflatable seal 30 and a second annular inflatable seal 32. The seals 30, 32 are formed by a circular bladder that is in fluid communication with a source of pressurized gas that is fed into the inlet stems 34, 36 located on of each seal 30, 32 from the pipes 40, 42 which are connected to a seal pressure regulator 38. The seal pressure regulator 38 is connected via pipe 44 to a gas/air source.

Figure 4A:
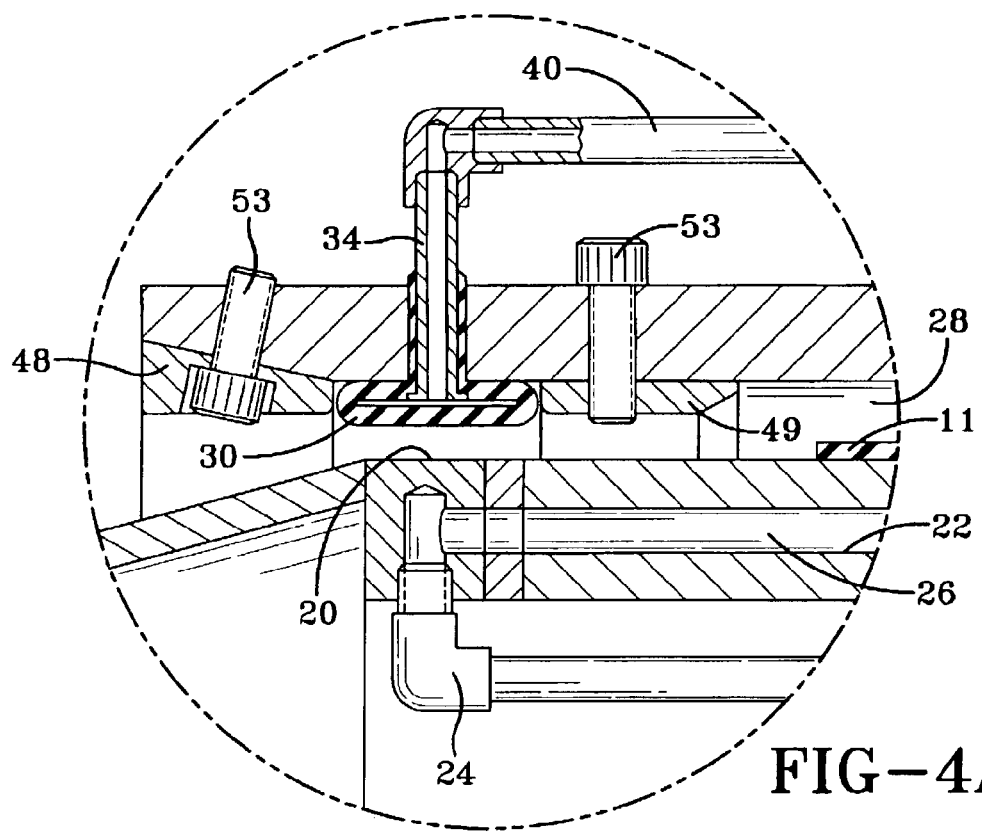
FIG. 4(A) is an enlarged view showing the seal in an uninflated condition.
Figure 4B:
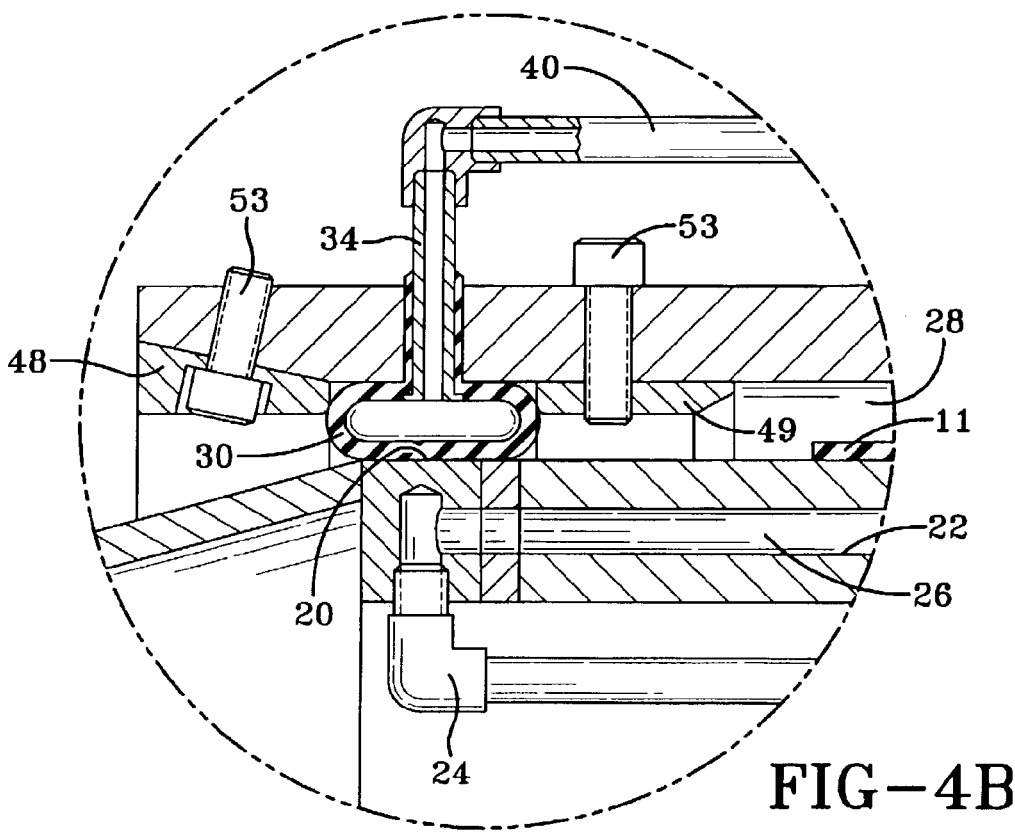
FIG. 4(B) is an enlarged view showing the seal in an inflated condition.
Figure 6:
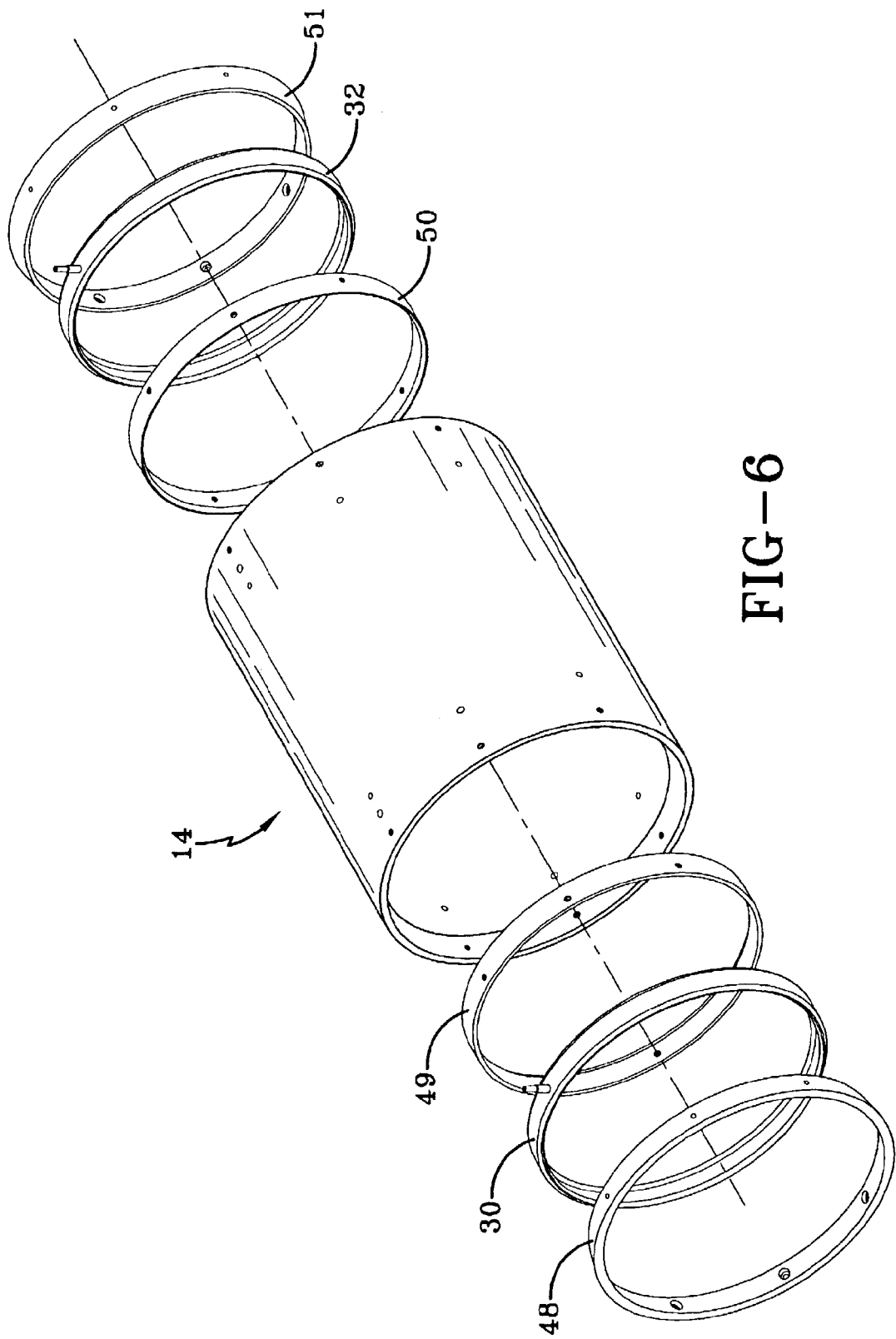
FIG. 6 is an exploded view of the housing.
Figure 7:
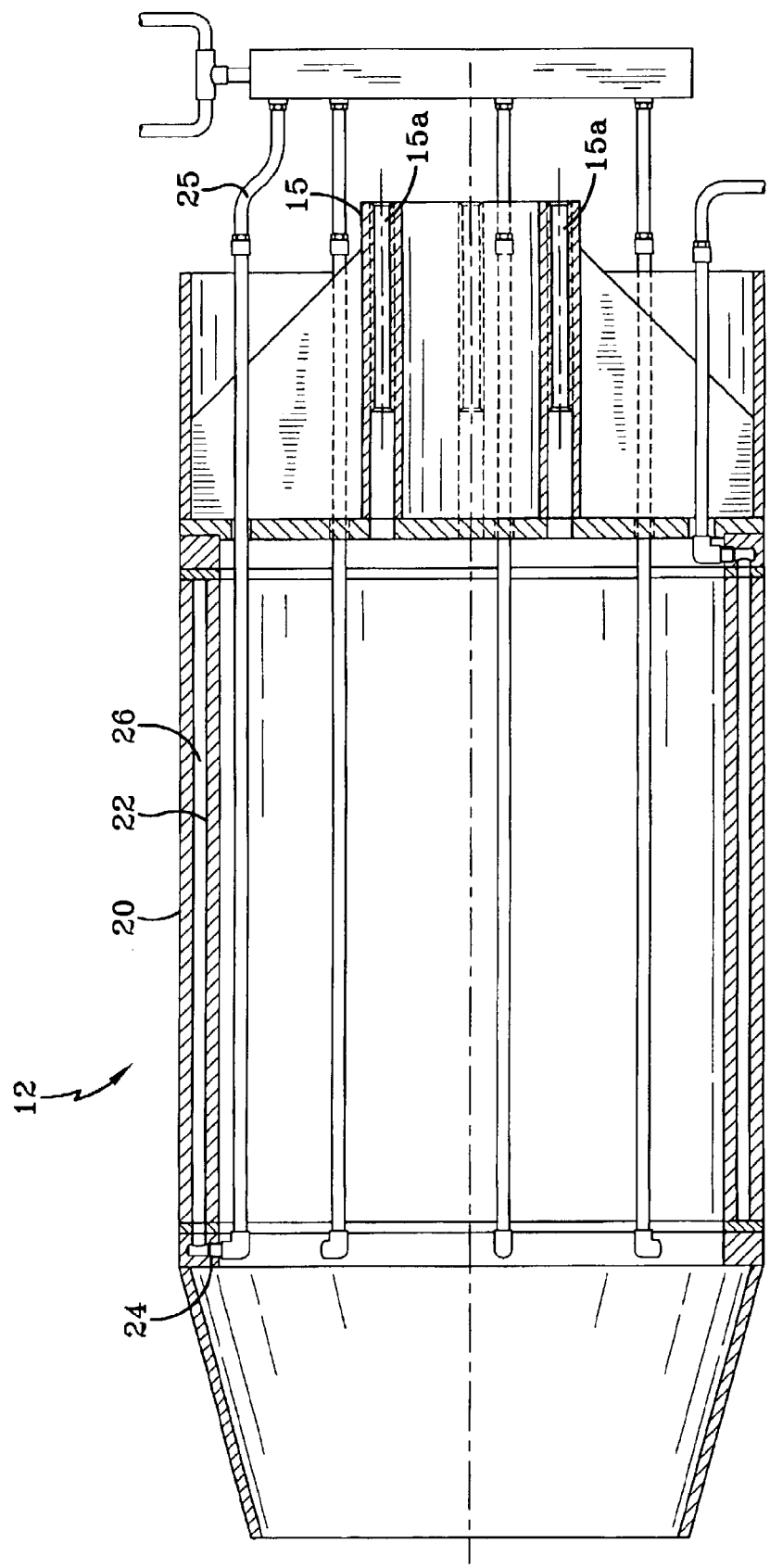
FIG. 7 is a cross-sectional view of the drum.

The seals 30, 32 can be formed of silicon rubber or another suitable material that can withstand curing temperatures. The seals are held in place by registration rings 48, 49, 50, 51. Each seal has an outer registration ring 48, 51 respectively on the outer end and an inner registration ring 49, 50 on the inner end to hold the seals 30, 32 in place upon inflation and pressurization of the space 28 as described herein. The registration rings 48, 49, 50, 51 are typically formed of solid metal such as steel and bolted onto the inner surface of the housing 14 by bolts 53. FIG. 4A illustrates the seal 30 in an uninflated condition. FIG. 4B illustrates the seal 30 in an inflated condition. When inflated the seal 30 contacts the outer surface 20 of the drum 12. The seals 30, 32 are usually inflated to a pressure about 5 psi greater than the pressure which will be applied to the space 28. This allows the seals 30, 32 to withstand the pressure applied to the enclosed space 28. Thus if the space is pressurized to 45 psi, the seals will be inflated to a pressure greater than 45 psi, e.g., about 50 psi. The housing 14 also contains a housing pressure valve 52. Pressurized gas is controlled by the housing pressure valve 52 and is fed into the space 28 between the housing 12 and the drum 10 such that by opening the valve 52, the space 28 can be pressurized.

To form an inner liner, a layer of uncured rubber 11 is applied on the outer surface 20 of the drum 12. Any conventional method for forming the inner liner 11 on the drum 12 may be used. In one method, the inner liner is separately formed in sheets and the sheet is wrapped around the drum and spliced in a manner that is well known in the art. The rubber layer can be formed of any composition that is useful in forming the inner liner of a tire. Rubber formulations that are useful for this purpose are well known in the art. These formulations will vary depending upon the nature and size of the tire that is constructed using the inner liner. One rubber composition that is useful in making the inner liner is a butyl rubber composition. Other examples are provided in U.S. Pat. No. 4,279,284 to Spadone. The layer may range from about 0.050 to 0.250 inch thick but it is not limited to this.

The seals 30, 32 at the end of the housing 14 are inflated to enclose the space 28 and create a sealed chamber that can be pressurized. Upon enclosing the space 28, air or another gas is fed into the space 28. This creates pressure in the space 28 which thereby pressurizes the layer of rubber 11. In one embodiment, the pressure applied is typically at least 40 psi. The pressure is selected so that it is high enough to prevent vulcanization products from foaming (i.e., forming pores in) the inner liner but low enough to remain within the operating limit of the inflatable seals. Upon application of pressure to the rubber, the applied pressure is maintained as the heat exchange chamber 26 of the drum 12 is fed with a heated fluid. In one embodiment, the heated fluid is steam that can be fed into the heat exchange chamber 26 through supply tubes 24. In the illustrated embodiment, there are twenty inlets 24 spaced eighteen degrees apart. However, the number and spacing is optional. The heat source can be a fluid such as steam or another heat exchange fluid like hot oil. In another embodiment, the heat exchange chamber could be heated by an electric heating element.

The heat source heats the drum 12 which in turn heats the layer of the rubber 11 adjacent the outer surface 20 of the drum 12. Typically, the rubber is heated to about 250 to 450° F. and more typically to about 280 to 320° F. The layer of the rubber 11 adjacent to the drum 12 begins to cure from the heat as the heat penetrates the layer of rubber 11 from one side. The actual heating conditions will depend upon the formulation of the rubber composition that is being cured, its thickness and the cure depth profile that is desired.

The cure profile that is produced in the inner liner will vary depending upon the size and shape of the tire and the tire molding process in which the inner liner is used. The outer surface of the inner liner will be cured less than the inner surface adjacent the drum. The outer surface may range in degree of cure from being essentially uncured to being nearly fully cured, e.g., about 0 to about 98% cure. The inner surface may be essentially fully cured or cured 60 to 100%. One objective is to select a cure profile that provides enough cure to the inner surface that the liner can be used in a bladderless molding process and the outer surface remains sufficiently uncured to adhere the other components of the tire to the liner in the tire building process.

Once the desired cure profile is achieved, the heat source is removed and a coolant is fed into the heat exchange chamber 26 to cool the drum, in turn cooling the layer of rubber 11 and effectively stopping any further curing of the rubber or slowing it to an insignificant rate. In one embodiment, the coolant source can be fed into the heat exchange chamber 26 through the supply tubes 24 located on the inner surface 22 of the drum. The coolant source can be water. The water can be cooled to a temperature that is effective to stop the cure as quickly as is desired. Once the curing is stopped by cooling the layer of rubber, the pressure applied to the rubber can be released. In one embodiment, this can be accomplished by turning off the housing pressure valve 52 and deflating the seals 30, 32. thereafter, the housing 14 is moved to its original position adjacent the drum 12. The partially cured layer of rubber 11 can be removed by peeling it from the drum surface, and applied to the next step of the tire building process. The cured side of the inner liner becomes gas and liquid impermeable, while the less cured or uncured side still holds the tacky properties that are helpful to add further components to the tire in the tire building process. The cured portion of the inner liner allows the molding of the rubber without the use of an air bladder because it is able to withstand the curing fluid in the molding process. In effect, the cured portion of the inner liner acts as a substitute for the curing bladder. Thus, the partially cured inner liner enjoys both the properties of a curing bladder, yet retains the tackiness properties desired to further add components of to build the tire.

It is to be clearly understood that the above description is intended by way of illustration and example only and is not intended to be taken by way of limitation. Other changes and modifications could be made, including both narrowing and broadening variations and modifications of the appended claims.

What is claimed is:

1. A method for curing an inner liner of a tire comprising the steps of:

providing an apparatus comprising a drum, the drum having an inner surface and outer surface; a heat exchange chamber on the inner surface of the drum; a housing that surrounds the drum with a space between the outer surface of the drum and the housing;

an inflatable seal at each end of the housing such that by inflating the seal, the seal expands and encloses the space between the drum and the housing; a gas inlet for feeding a gas to the space and pressurizing the space; a heat source in communication with the heat exchange chamber for heating the drum; and a coolant source in communication with the heat exchange chamber for cooling the drum;

providing a layer of uncured rubber on the outer surface of the drum;

inflating the seal to enclose the space between the drum and the housing;

feeding a gas to the space to pressurize the space and the layer of rubber;

heating the drum, thereby heating the layer of rubber from the surface adjacent the drum to cure the layer of rubber to a desired depth thereby forming a partially cured layer of rubber wherein the first surface is cured to a greater extent than the opposite surface and the opposite surface remains tacky;

cooling the drum, thereby cooling the layer of rubber; and releasing the pressure in the space when the layer has cooled thereby producing a partially cured inner liner of a tire.

2. The method of claim 1 wherein the layer of rubber is heated to a temperature of about 250 to 450° F.

3. The method of claim 2 wherein the uncured layer of rubber is heated for a time sufficient to provide a desired cure profile to the layer of rubber.

4. The method of claim 3 wherein the layer of uncured rubber is heated to a temperature and for a time such that a portion of the thickness of the layer is partially cured and another portion of the thickness of the layer is more fully cured.

5. The method of claim 4 wherein the drum is cooled to a temperature at which the rubber does not continue to cure.

6. The method of claim 1 wherein the pressure applied to the layer of uncured rubber is sufficient to prevent the layer from being foamed by vulcanization byproducts during curing.

7. The method of claim 6 wherein the pressure applied to the layer of uncured rubber is at least 40 psi.

8. The method of claim 1 wherein the layer of uncured rubber is about 0.050 to 0.250 inches thick.

* * * * *